(12) United States Patent
Ogawa

(10) Patent No.: US 6,328,836 B1
(45) Date of Patent: Dec. 11, 2001

(54) METHOD AND APPARATUS FOR PRODUCING TIRES

(75) Inventor: Yuichiro Ogawa, Fuchu (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/323,485

(22) Filed: Jun. 1, 1999

(30) Foreign Application Priority Data

Jun. 1, 1998 (JP) .................................................. 10-151192
Dec. 24, 1998 (JP) .................................................. 10-366363

(51) Int. Cl.$^7$ .................................................. B29D 30/16
(52) U.S. Cl. ..................... 156/117; 156/135; 156/397; 156/398
(58) Field of Search ..................................... 156/117, 121, 156/133, 135, 130.7, 397, 123, 398, 405.1, 408, 173, 175; 152/548, 560, 562

(56) References Cited

U.S. PATENT DOCUMENTS

| | | | |
|---|---|---|---|
| 1,259,997 | * 3/1918 | Kline | ................................... 156/397 |
| 4,409,059 | 10/1983 | Holroyd et al. . | |
| 5,161,290 | 11/1992 | Nagai et al. . | |
| 5,453,140 | * 9/1995 | Laurent et al. | ...................... 156/117 |
| 5,616,209 | 4/1997 | Laurent et al. . | |

FOREIGN PATENT DOCUMENTS

| | | |
|---|---|---|
| 0 580 055 A1 | 1/1994 | (EP) . |
| 0 943 421 A1 | 9/1999 | (EP) . |

\* cited by examiner

*Primary Examiner*—Geoffrey L. Knable
(74) *Attorney, Agent, or Firm*—Oliff & Berridge, PLC

(57) ABSTRACT

Method and apparatus for producing tires, in which a carcass layer is formed by continuously feeding a carcass cord from a cord passage and applying the carcass cord over an outer peripheral surface of a substantially toroidal core so as to extend in a meridian direction of the core while the core is subjected to an indexing movement in its circumferential direction. The carcass cord is arranged so as to extend linearly from one end to the other end of the core with respect to a meridian direction thereof, and vice versa, under the operation of a feed mechanism which is capable of achieving a reciprocating movement. A turn-up portion of the carcass cord is wound on, and supported by a pin at the end of the core in the meridian direction, and subsequently adhered onto the core by a press head which can be advanced relative to the pin.

18 Claims, 20 Drawing Sheets

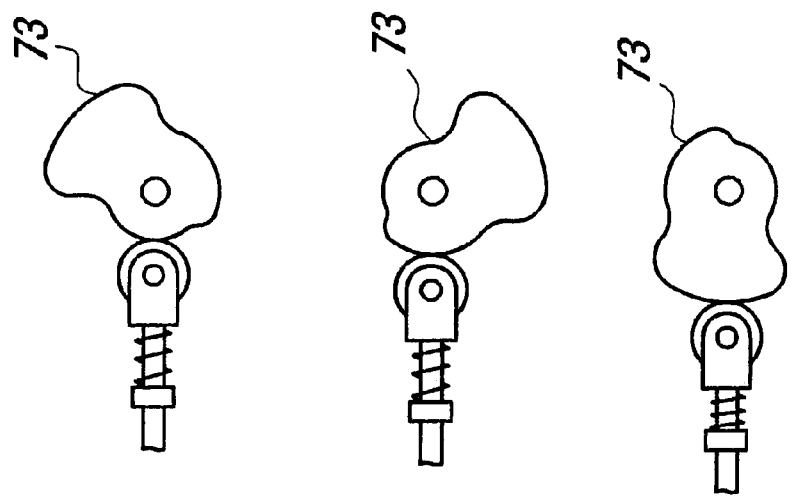
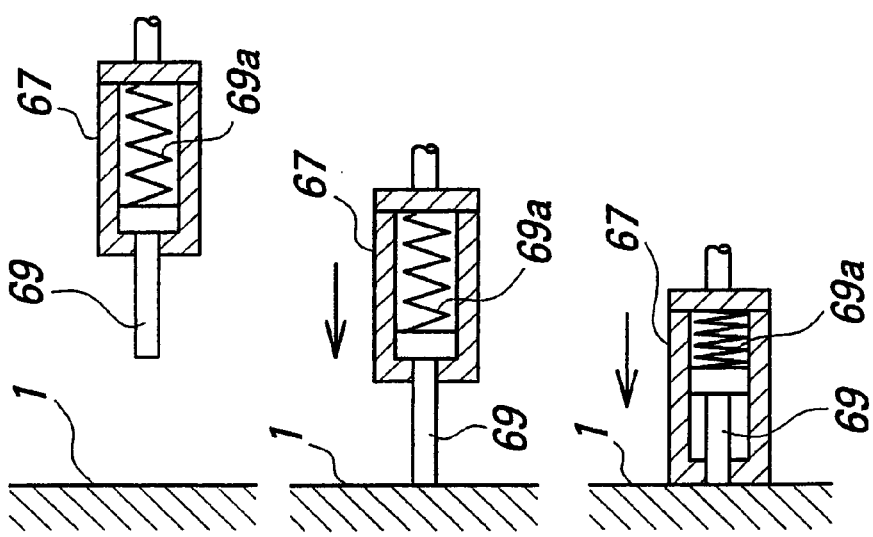
FIG. 14a
FIG. 14b
FIG. 14c

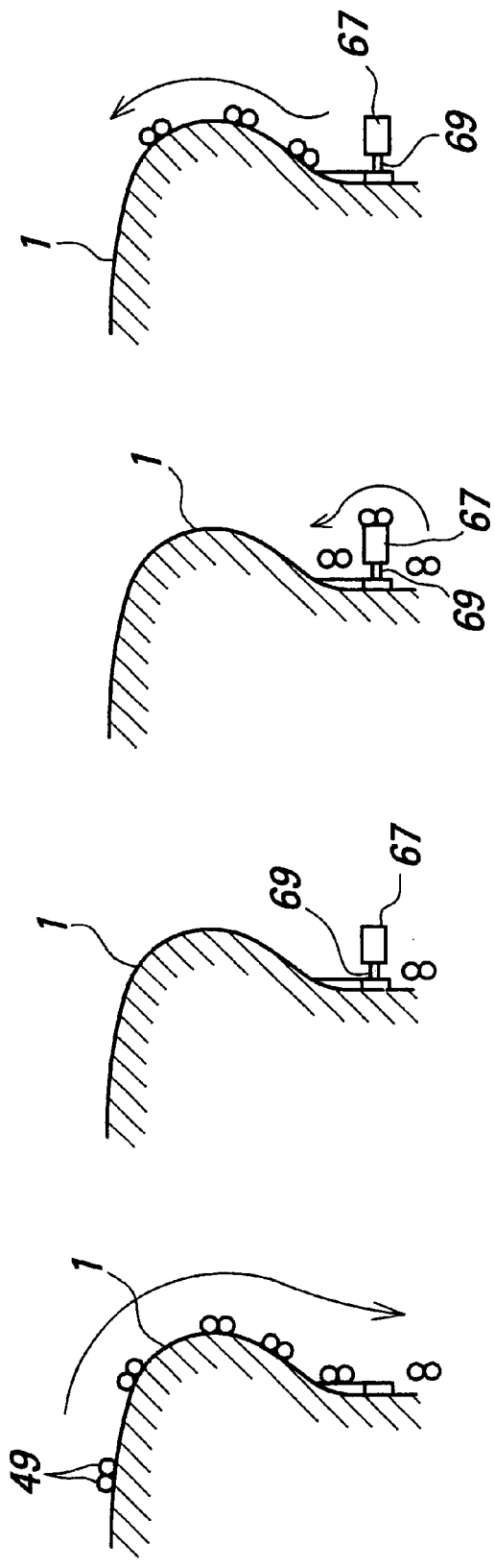

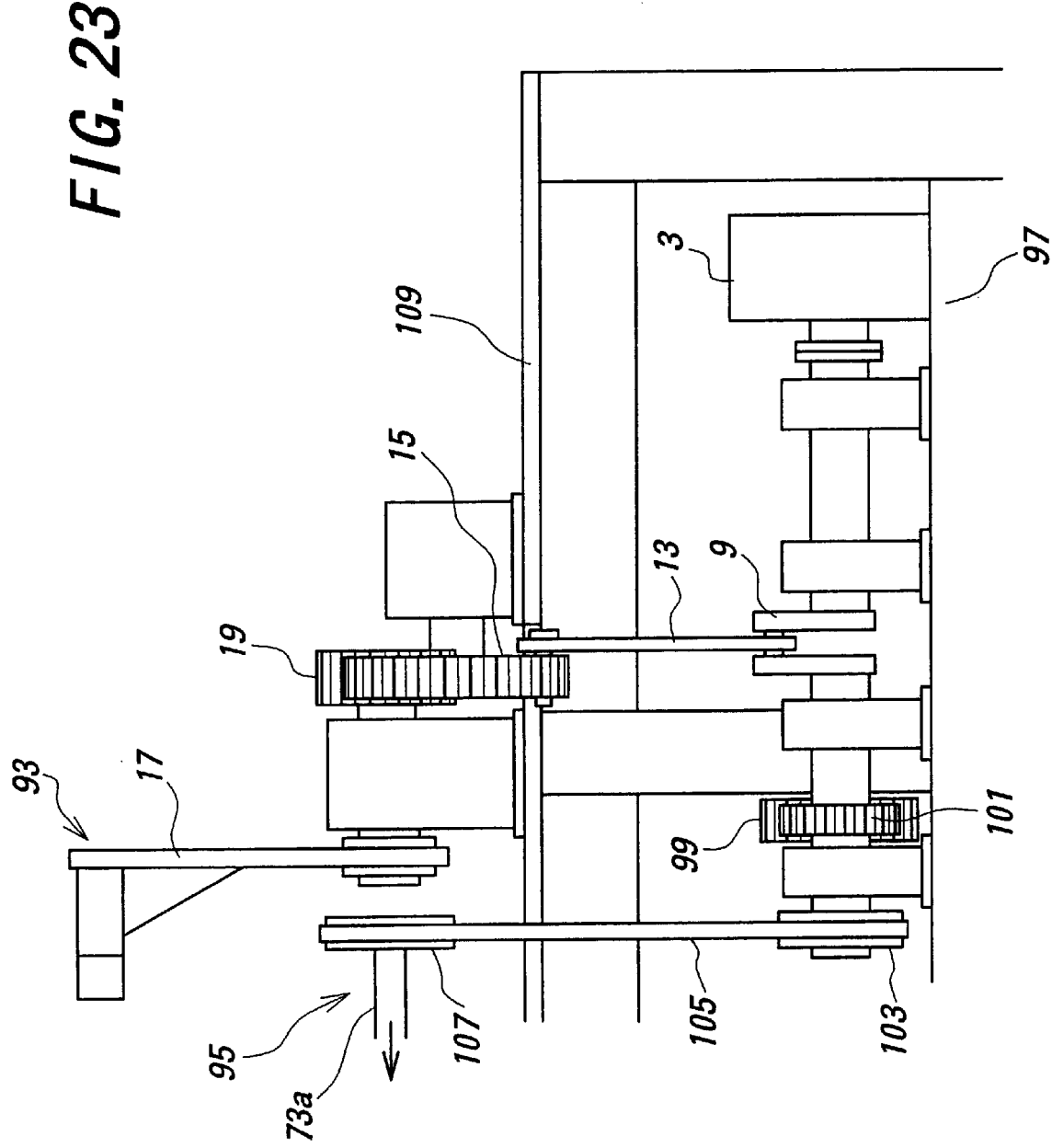

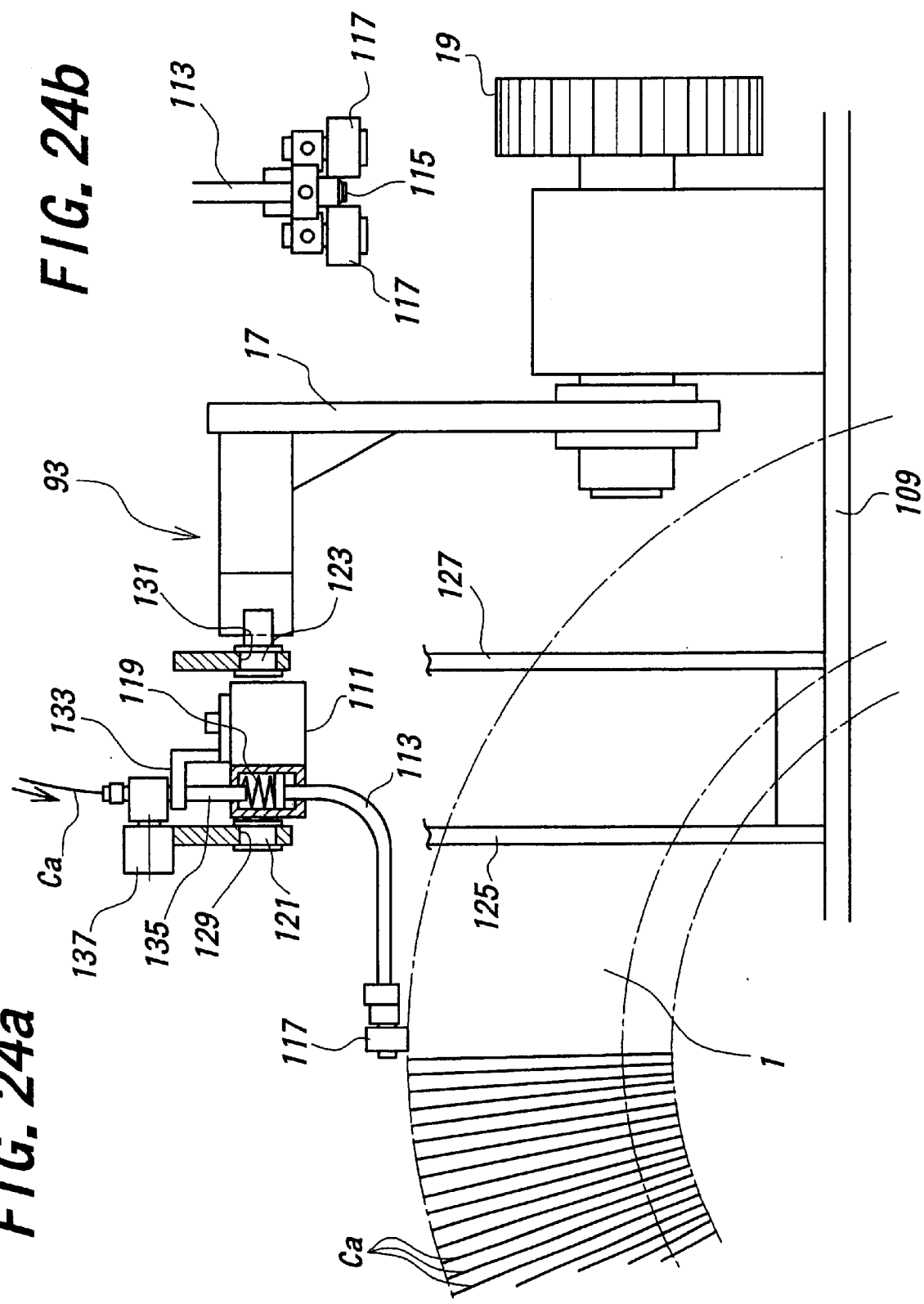

METHOD AND APPARATUS FOR PRODUCING TIRES

BACKGROUND OF THE INVENTION

1. Field of the Invention

The present invention relates generally to method and apparatus for producing tires and, in particular, to an apparatus which is capable of automatically applying a carcass cord to form a carcass layer on a core having an outer peripheral surface which corresponds in shape to the inner peripheral surface of a product tire, and also to a method for producing tires in which a carcass layer is formed by operating such apparatus.

2. Description of the Related Art

There is known a method of producing tires in which a carcass is formed by applying a carcass cord onto a rigid core. Thus, for example, U.S. Pat. No. 5,616,209 discloses an apparatus for applying a carcass cord, in which an eyelet is fixedly secured to an endless chain which is passed over pulleys surrounding a core. The eyelet is arranged so as to undergo a reciprocating movement on the outer peripheral surface of the core in its meridian plane, so that turn-up portions of the carcass cords are successively arranged on the outer peripheral surface of the core. These turn-up portions are adhered onto the core under pressure, by a press device comprised of a fork member and a hammer which are advanced and retracted in association with each other.

However, the known method explained above suffers from problems that the apparatus as a whole is complicated in structure and has an increased size, besides that the fork member and the hammer have to be independently and separately arranged adjacent to the turn-up portion of the cord. The construction and operation of the press device are complicated, and it is thus difficult to realize a compact arrangement. Moreover, there is a problem that when the carcass cord fed through the eyelet is subjected to tension, the endless chain to which the eyelet is attached tends to be twisted, thereby preventing a smooth operation of the chain.

DISCLOSURE OF THE INVENTION

The present invention has been conceived with an objective to eliminate the above-mentioned problems involved in the conventional method.

A primary object of the present invention to provide an improved apparatus for producing tires, which can be made simple and compact in structure and operated at an increase speed, ensuring that the carcass cord is always fed in a smooth and positive manner.

Another object of the present invention is provide an improved apparatus for producing tires, including a press mechanism for adhering the turn-up portion of the carcass cord onto the core, which can be made simple and compact in structure.

According to one aspect of the present invention, there is provided an apparatus wherein a carcass layer is formed by continuously feeding a carcass cord from a cord passage and applying the carcass cord over an outer peripheral surface of a substantially toroidal core so as to extend in a meridian direction of the core while the core is subjected to an indexing movement in its circumferential direction. The apparatus comprises a feed mechanism for causing a reciprocating movement of the cord passage in the meridian direction of the core, and the feed mechanism includes a swing arm having a distal end which supports the cord passage. The apparatus also comprises a press mechanism including a pin about which the carcass cord is supported at a turn-up position of the reciprocating movement of the cord passage, and which can be moved into abutment with the core, and a press head which can be advanced relative to the pin, for pressing a loop portion of the carcass cord to the core. The press mechanism is arranged so that it can be swung in the indexing direction along with the indexing movement of the core, and returned to its initial position after the pin has been separated from the core.

With the above-mentioned arrangement of the apparatus according to the present invention, the reciprocating or swinging movement of the arm in the feed mechanism causes the cord passage to be reciprocated within a predetermined angular range during the indexing movement of the core. Therefore, not only the feed mechanism itself, but also the dividing system therefor can be made simple and compact in structure, while allowing the carcass cord to be linearly arranged on the outer peripheral surface of the core at predetermined circumferential intervals.

Also, during the reciprocating movement of the cord passage, the turn-up portion formed on the carcass cord is wound about, and supported by the pin which is in its advanced position, thereby maintaining the turn-up portion in a desired manner. The turn-up portion is adhered onto to the core by the press head which has been advanced relative to the pin to bring the turn-up portion into tight contact with the core, effectively preventing the jamming or disorder of the carcass cord.

As regards the arrangement of the pin and the press head relative to each other, it is preferred that the press head is attached to a distal end of the a rod which can be advanced and retracted relative to the core, and the pin is attached to the press head so as to be urged in the advancing direction. In this instance, the pin is brought into abutment against the core by an initial advancing stage of the rod, and the press head is then brought into abutment against the core by a successive advancing stage of the rod. Such arrangement is advantageous to realize a press mechanism which is simple and compact in structure.

In connection with the above-mentioned arrangement of the pin and the press head, it is preferred that the press mechanism is capable of achieving a swinging movement in the indexing direction of the core, along with the indexing movement of the core when the pin or press head is in abutment against the core. It is thus possible to operate the pin and the press head even during the indexing operation, thereby effectively reducing the tact time.

Advantageously, the feed mechanism and the press mechanism are connected to a common drive motor, so that the apparatus can be made more compact in structure and less costly.

Preferably, at least one guide roller for the carcass cord fed from the cord passage is disposed adjacent to an opening of the cord passage. In this instance, the rotation of the guide roller allows the carcass cord to be fed smoothly, even when the carcass cord is under tension.

The feed mechanism may be arranged such that the cord passage undergoes a reciprocating movement at a position adjacent to the outer peripheral surface of the core. In this instance, the guide roller functions as a pressure roller for causing the carcass cord fed from the cord passage to be directly and positively adhered onto the outer peripheral surface of the core at a linear portion of the carcass cord.

Alternatively, the feed mechanism may be arranged such that the cord passage undergoes a reciprocating movement at a position which is spaced from the outer peripheral surface of the core, thereby making it possible to operate the feed mechanism at a higher speed. In this instance, the feed mechanism preferably comprises a guide plate for guiding the carcass cord fed from the cord passage to the outer peripheral surface of the core. Such a guide plate allows the carcass to be accurately arranged at a desired position on the core, even under an increased operating speed of the cord passage and, hence, under an increased feed speed of the carcass cord.

The arm of the feed mechanism by engaged with a cam groove so as to define a reciprocating path of the cord passage. Such arrangement of the feed mechanism is advantageous in that, when the carcass cord fed from the cord passage is directly adhered onto the outer peripheral surface of the core, the reaction force of the pressure roller while urging the carcass cord onto the core can be effectively born by the cam groove.

Alternatively, the arm of the feed mechanism may be a crank-shaped arm which defines a reciprocating path of the cord passage as a distance between a center of rotation of the arm and the cord passage at the distal end of the arm. Such arrangement of the feed mechanism is advantageous in that, when the cord passage is subjected to a reciprocating movement at a position spaced from the outer surface of the core, it is readily possible to increase the moving speed of the cord passage.

The feed mechanism is preferably connected to a drive motor through a drive system including a first gear which can be reciprocated within a predetermined angular range, and a second gear meshed with the first gear. The first gear may be connected to the drive motor through a crank and a connecting rod. The first and second gears may be in the form of a large gear and a small gear, respectively. Such a drive system is simple and compact in structure.

With such a drive system, the second gear may be directly attached to the crank-shaped arm of the feed mechanism which is provided with the cord passage, thereby allowing the arm to undergo a reciprocating movement within a predetermined angular range. Alternatively, the feed mechanism may be provided with a yoke through which the arm of the feed mechanism, which is provided with the cord passage, to the second gear to thereby reciprocate the cord passage. It is then possible that the arm and the cord passage are moved radially inwards or outwards with respect to the fulcrum of the yoke within a range as defined by a slotted hole in the yoke, so that the cord passage can be reciprocated in a desired manner even when the arm is in engagement with the cam groove as described above.

Advantageously, the press mechanism in the apparatus according to the present invention comprises a base plate to which the pin and the press head are attached, a stationary member for rotatably supporting the base plate through a pivot which is directed perpendicularly to a center axis of the core, and a returning means for returning the base plate to its initial position after it has been swung in the indexing direction of the core. The returning means, which may be in the form of a cam, a return spring, etc., is preferably associated with a stopper for preventing an excessive movement of the base plate which has reached its initial position.

Preferably, the press mechanism comprises a rod which can be advanced and retracted with respect to the core, wherein the rod is disposed on the base plate and normally biased in the retracting direction, and has a distal end on which the press head is provided, with the pin being disposed in the press head so as to be urged in the advancing direction thereof. Such an arrangement of the pin and the press head is simple in structure because they can be coaxially arranged in a compact manner. Moreover, the pin and the press head can be properly operated and controlled simply by the advancing or retracting movement of the rod.

In this instance, the advancing or retracting movement of the rod can be readily achieved by a drive system in which the drive motor for the press mechanism has an output shaft provided with a cam which is in abutment against a rear end of the rod.

According to another aspect of the present invention, there is provided a method for producing tires, wherein a carcass layer is formed by continuously feeding a carcass cord from a cord passage and applying the carcass cord over an outer peripheral surface of a substantially toroidal core so as to extend in a meridian direction of the core while the core is subjected to an indexing movement in its circumferential direction.

In the method according to the present invention, the carcass cord is applied so as to extend linearly from one end to the other end to the other end of the core with respect to its meridian direction, and vice versa, under the operation of a feed mechanism which is capable of achieving a reciprocating movement. The turn-up portion of the carcass cord is wound about, and supported by a pin at the end of the core and subsequently adhered onto the core by a press head which can be advanced relative to the pin.

The indexing movement of the core may be carried out with the press head advanced relative to the pin, while moving the press head in the same direction as the core. Additionally, or alternatively, the indexing movement of the core may be carried out while moving the pin in the same direction as the core before formation of the turn-up portion of the carcass cord, which turn-up portion is formed after completion of the indexing movement of the core.

After formation of the carcass layer by the method according to the present invention, it is of course that bead rings, tread rubber and other tire component members are arranged in place on the carcass layer to form a green tire ready for vulcanization.

BRIEF DESCRIPTION OF THE DRAWINGS

The present invention will be further described below with reference to preferred embodiments shown in the accompanying drawings, in which:

FIGS. 14a, 14b and 14c are sectional views showing the operation of the press mechanism;

FIGS. 17a to 17d are views sequentially showing the moving path of the guide rollers in the apparatus of FIG. 15;

FIG. 23 is side view showing the drive system in enlarged scale; and

FIG. 24 is a side view showing the cord feeding portion in enlarged scale.

DETAILED DESCRIPTION OF THE PREFERRED EMBODIMENTS

Figure 1:
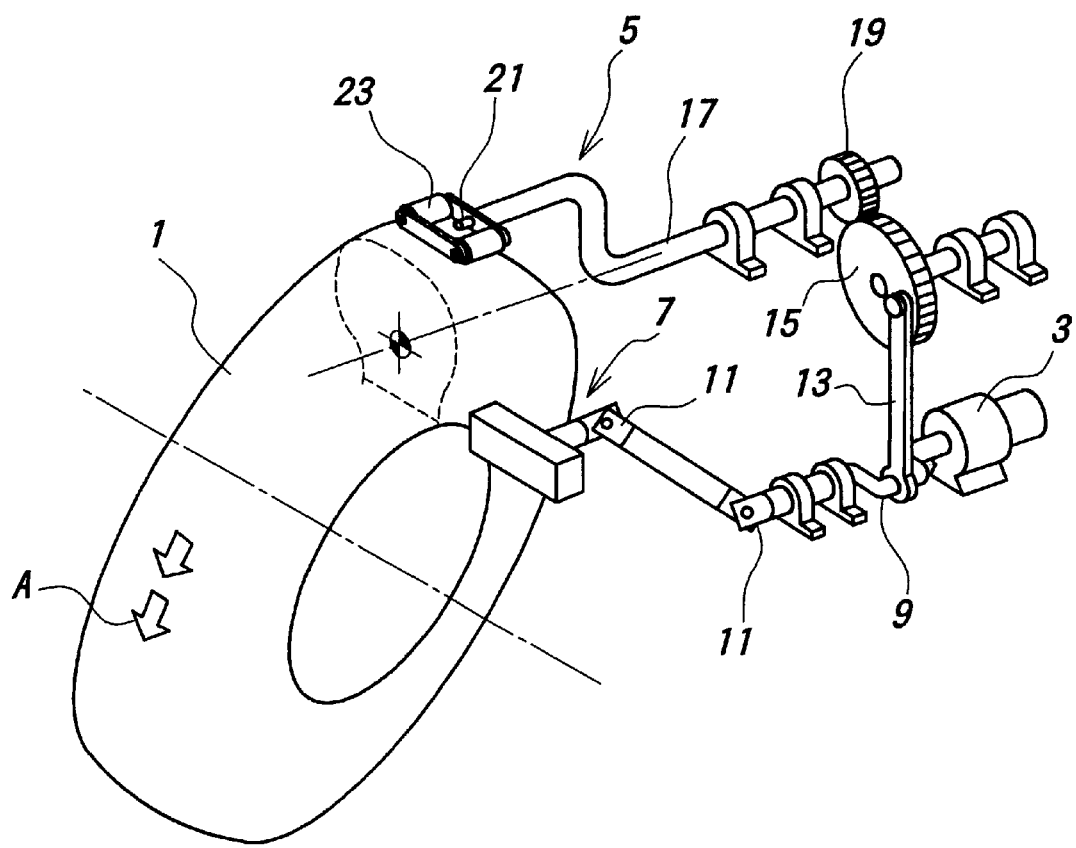
FIG. 1 is a schematic perspective view showing one embodiment of the apparatus according to the present invention.

Referring now to the drawings, in particular to FIG. 1, there is shown one embodiment of the apparatus according to the present invention, which serves to form a carcass layer on a flexible or highly rigid core having an outer peripheral surface corresponding in shape to the inner peripheral surface of a production tire. In this instance, by way of example, a carcass cord is automatically applied while a cord passage is subjected to a reciprocating movement at a location which is spaced from the outer peripheral surface of the core.

In FIG. 1, reference numeral 1 designates a core having a generally toroidal shape, which can be indexed by a predetermined angle at one time in the circumferential direction shown by arrow A. Furthermore, reference numeral 3 designates a geared motor of which the output is transmitted to a feed mechanism 5 and two press mechanisms 7. Thus, the geared motor 3 serves as a common drive source for these mechanisms 5 and 7. Although the illustration has been omitted from FIG. 1, the two press mechanisms 7 are disposed on opposite sides of the core 1 to form a pair.

To this end, as will be explained in further detail hereinafter, the output shaft of the geared motor 3 is connected to cams of the respective press mechanisms 7 through a crank 9 and universal joints 11. The output shaft of the geared motor 3 is also connected to a large gear 15 through a connecting rod 13 which is connected to the crank 9. The large gear 15 is meshed with a small gear 19 which is secured to a crank-shaped arm 17 of the feed mechanisms 5. The drive system as described above may be further provided with reduction gears, toothed gears, etc., which are suitably interposed as intermediate transmission members, if necessary.

In the drive system shown in FIG. 1, the arm length of the crank 9 and the diameter of the large gear 15 may be suitably designed so that one revolution of the crank 9 causes the large gear 15 to swing within an angular range of ±60°. Also, the gear ratio between the large gear 15 and the small gear 19 may be designed to be 2:1 so that one revolution of the crank 9 is converted to a swinging motion of the small gear 19 within an angular range of ±120°.

The crank-shaped arm 17 of the feed mechanism 5 has a front portion and a rear portion. The front portion of the arm 17 is off-centered with reference to the center axis of the rear portion by a predetermined amount, as shown in FIG. 1. The center axis of the rear portion of the arm 17 coincides with the center of a circle which corresponds to the outer contour of the core 1 in its meridian plane. Furthermore, the front portion of the arm 17 has a distal end which is provided with a cord passage 21, as more particularly shown in FIGS. 2a and 2b. The off-centering amount of the front portion of the arm 17 with reference to its rear portion may be determined so that the cord passage 21 can be reciprocated in the close vicinity of the outer peripheral surface of the core when the core 1 has an arcuate outer contour in the meridian section. Alternatively, irrespective of whether the core 1 has an arcuate outer contour or otherwise, the off-centering amount may be determined so that the cord passage 21 can be reciprocated at a location which is spaced from the outer peripheral surface of the core 1. The arm 17 has a hollow structure so that arm 17 as a whole serves to guide the carcass cord and the opening at the distal end of the arm 17 forms part of the cord passage 21. Alternatively, however, the arrangement may be such that the distal end of the arm 17 is provided with a separate cord passage.

Figure 2A:
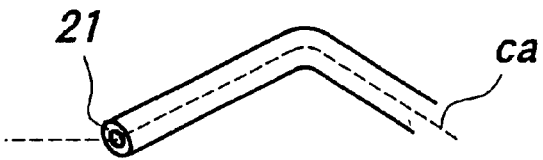
FIGS. 2a and 2b are perspective views showing examples of guide device for the carcass code.
Figure 2B:
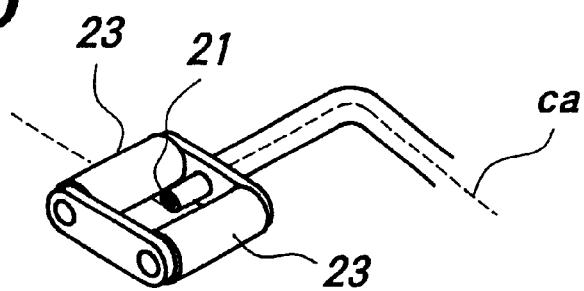
Figure 3:
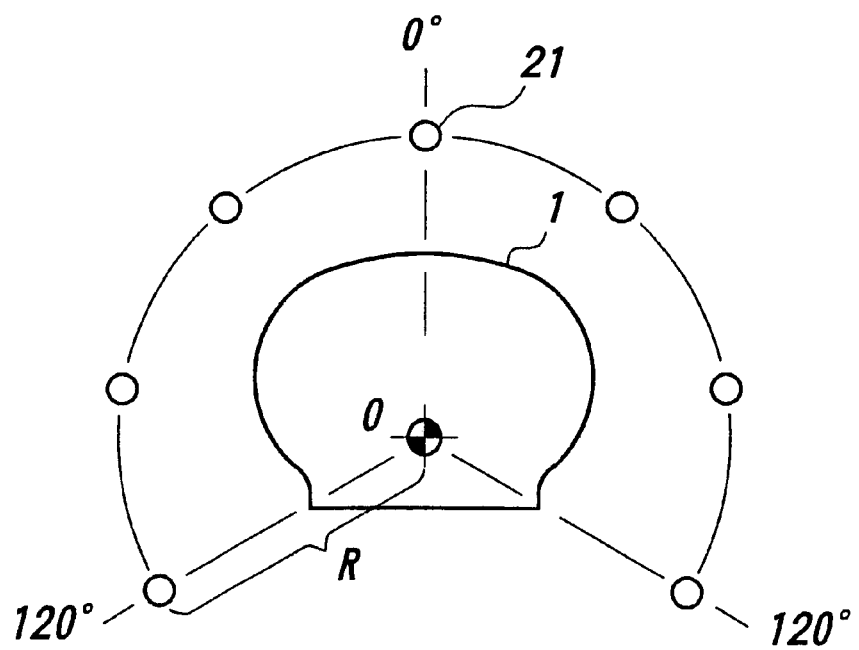
FIG. 3 is an explanatory view showing the region in which the cord passage swings with respect to the meridian section of a core.

The carcass cord may be fed directly from the cord passage 21, as shown in FIG. 2a. Alternatively, as shown in FIG. 1 and FIG. 2b, the carcass cord may be fed through the pair of guide rollers 23 which are disposed in the vicinity of the cord passage 21. These guide rollers 23 are freely rotatable in response to the reciprocating motion of the cord passage 21 so that the carcass cord can be smoothly fed under an appropriate tension.

In the feed mechanism 5 having a structure as described above, the rotation of the geared motor 3 causes the rotation of the large gear 15 within the angular range of ±60° and, hence, the rotation of the small gear 19 within the angular range of ±120°. The cord passage 21 is thus caused to reciprocate within the angular of 35 120° at a location spaced from the outer peripheral surface of the core 1 about the rotation center O of the arm 17, i.e., the longitudinal axis of its rear portion, with an off-centering amount R as a radius. As a result, the carcass cord fed from the cord passage 21 is applied linearly in the meridian direction of the core 1 so as to extend from a one end of the core 1 to the other.

The reciprocating movement of the cord passage 21 serves to reduce the moving speed of the cord passage 21 and, hence, the feeding speed of the carcass cord from the cord passage 21 particularly when the cord passage 21 changes its moving direction from the advancing direction to the retracting direction, or vice versa. It is therefore possible to effectively prevent the carcass cord from breakage when the turn-up portion of the cord is wound about, and supported in engagement with a pin of the press mechanism to be described hereinafter.

Figure 4A:
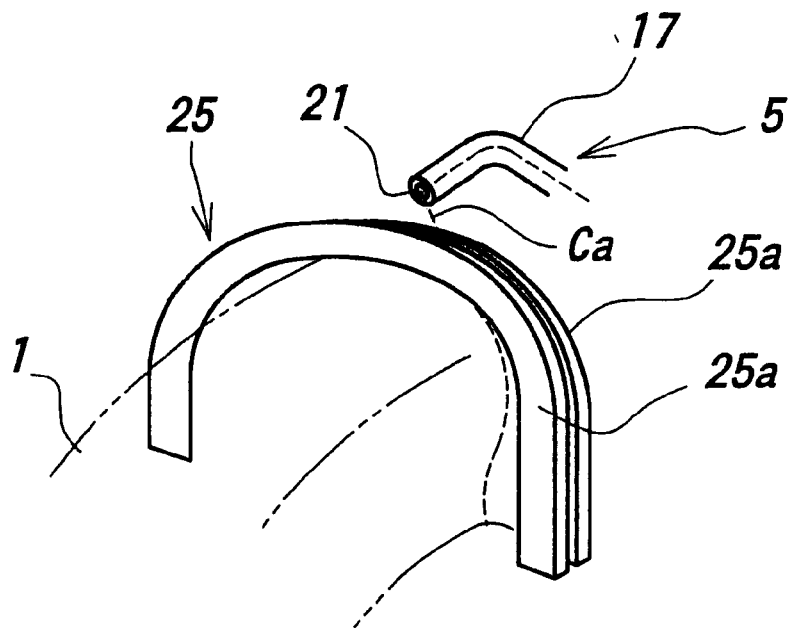
FIGS. 4a and 4b are explanatory views showing a guide plate and operation thereof.
Figure 4B:
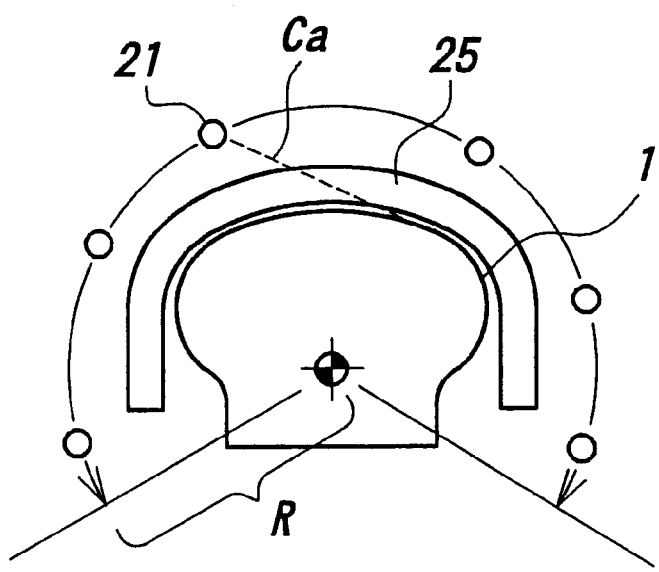

By reciprocating the cord passage 21 at a location which is spaced from the outer peripheral surface of the core 1, a guide member 25 as shown in FIGS. 4a and 4b can be arranged between the cord passage 21 and the outer peripheral surface of the core 1. The guide member 25 may be comprised of a pair of glass plates 25a, 25a which are arranged relative to each other so as to leave a predetermined distance therebetween. Preferably, the guide member 25 has an inner peripheral surface which extends along the outer peripheral surface of the core 1, and an outer peripheral surface which extends along the locus of the cord passage 21. In this way, the cord passage 21 can be reciprocated at a higher speed and the carcass cord Ca can be guided accurately onto a predetermined position of the core 1 even when the carcass cord Ca is subjected to undulation in the circumferential direction of the core 1, or the moving path of the cord passage 21 is subjected to fluctuation.

In the arrangement of the feed mechanism 5 wherein the guide member 25 for the carcass cord is comprised of a pair of glass plate 25a, it is preferred that the distance between the glass plates is slightly larger than the diameter of the carcass cord Ca. The guide member 25 may be alternatively comprised of a rigid plate such as a single glass plate so that the carcass cord Ca fed from the cord passage 21 is guided by a side surface of the guide plate 25 before it reaches a predetermined position of the outer peripheral surface of the core 1.

Another embodiment of the apparatus according to the present invention will be explained below with reference to FIG. 5 which shows a different arrangement of the swinging feed mechanisms, and FIG. 6 which shows the drive system therefor.

The feed mechanism designated as a whole by reference numeral 31 includes an arm 35 of which the rear portion is connected to an appropriate stationary member through a spherical bearing 33. The front portion 35a of the arm 35 has a distal end provided with a cord passage 37 which is essentially the same as the core passage 21. The front portion 35a is supported by a hinge 35b and biased by spring means 39 so that the distal end thereof is urged against the outer peripheral surface of the core 1. The spring means 39 may be comprised, for example, of a torsion spring or a tension coil spring as shown in FIG. 6.

The arm 35 of the feed mechanism 31 is engaged with a slotted hole 41a in a yoke 41 which can driven into an angular movement about a predetermined fulcrum by a driving means to be described hereinafter. Thus, during the angular movement of the yoke 41, the arm 35 can be displaced longitudinally along the slotted hole 41a in the yoke 41. The feed mechanism 31 further includes a stationary cam plate 43 extends in the meridian direction of the core 1 and is arranged so that it is spaced from the outer peripheral surface of the core 1 by a predetermined small clearance. The cam plate 43 has a cam groove 45 which is preferably similar in shape to the meridian-sectional contour of the core 1. The cam groove 45 is engaged by the front portion 35a of the arm 35 in front of its engaging region with the yoke 41, through a cam follower 47, so as to define the reciprocating path of the arm 35 and, hence, that of the cord passage 37 as a result of the angular movement of the yoke 41.

A pair of guide rollers 49, which are essentially the same as the above-mentioned rollers 23, are arranged close to the opening of the cord passage 37 so as to allow the carcass cord Ca to be fed smoothly. These guide rollers 49 are urged against the outer peripheral surface of the core 1 under a predetermined force by the spring means 39. Thus, the carcass cord Ca fed through the guide rollers during the reciprocating movement of the cord passage 37 is pressure-fitted and adhered onto the outer peripheral surface of the core 1. Accordingly, the guide rollers 49 in the present embodiment functions as a pressure-fitting rollers as well.

The guide rollers 49 may be arranged so that they can be rotated as an integral body about the center of the opening of the cord passage 37. Such an arrangement, however, is not an indispensable condition particularly when the orientation or posture of the arm 35 undergoing the reciprocating movement is controlled so that the front portion 35a is normally biased toward the outer peripheral surface of the core 1, for example, by the spring means 39.

As in the previous embodiment, the drive system for the feed mechanism includes a geared motor 3 of which the output shaft is connected to a large gear 15 through a crank 9 and a connecting rod 13, and the large gear 15 is meshed with a small gear 19. The small gear 19 has an output shaft to which the yoke 41 is secured so that the yoke 41 is capable of achieving a reciprocating angular movement within a predetermined angular range (e.g., ±120°) about the center axis of the output shaft.

Figure 7:
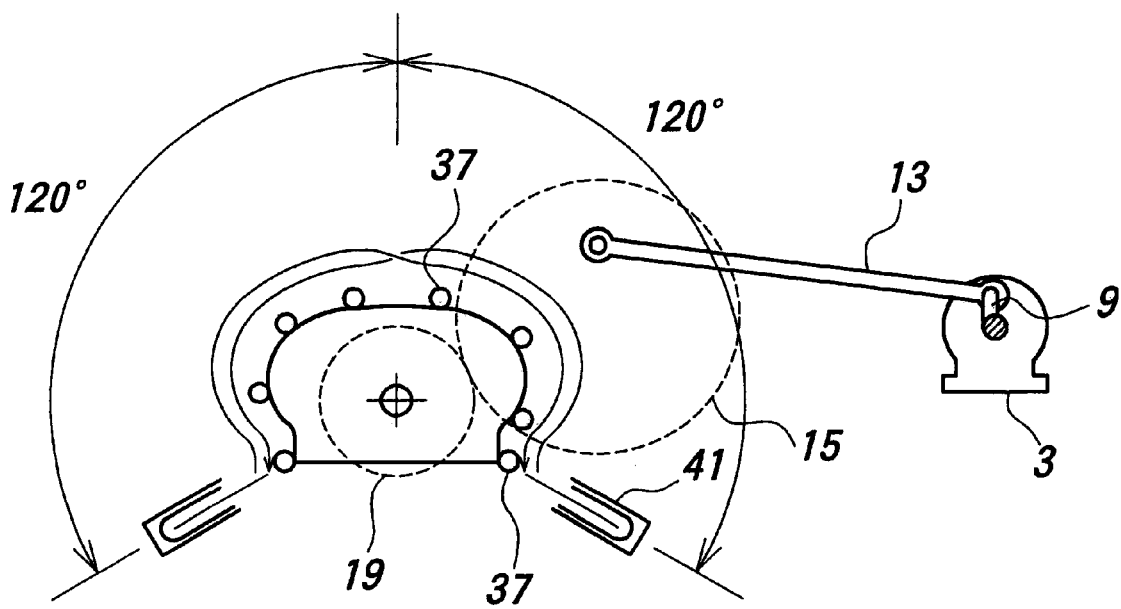
FIG. 7 is a schematic view showing the relationship between the operation of the drive system shown in FIG. 6 and the operation of the swinging feed mechanism.

The operational relationship between the drive system and the feed mechanism 31 will be explained below with reference to FIG. 7. It is assumed that the rotation of the crank 9 causes a swinging movement of the large gear 15 within a range of ±60° and, hence, a swinging movement of the small gear 19 within a range of ±120°. This means that the yoke 41 connected to the small gear 19 achieves a swinging movement within a range of ±120°, so that the cord passage 37 also achieves a swinging movement within a range of ±120° along the outer peripheral surface of the core 1. As a result, the guide rollers 49 serve to adhere the carcass cord Ca onto the outer peripheral surface of the core 1 over substantially the entirety of the angular range of ±120°.

Figure 8:
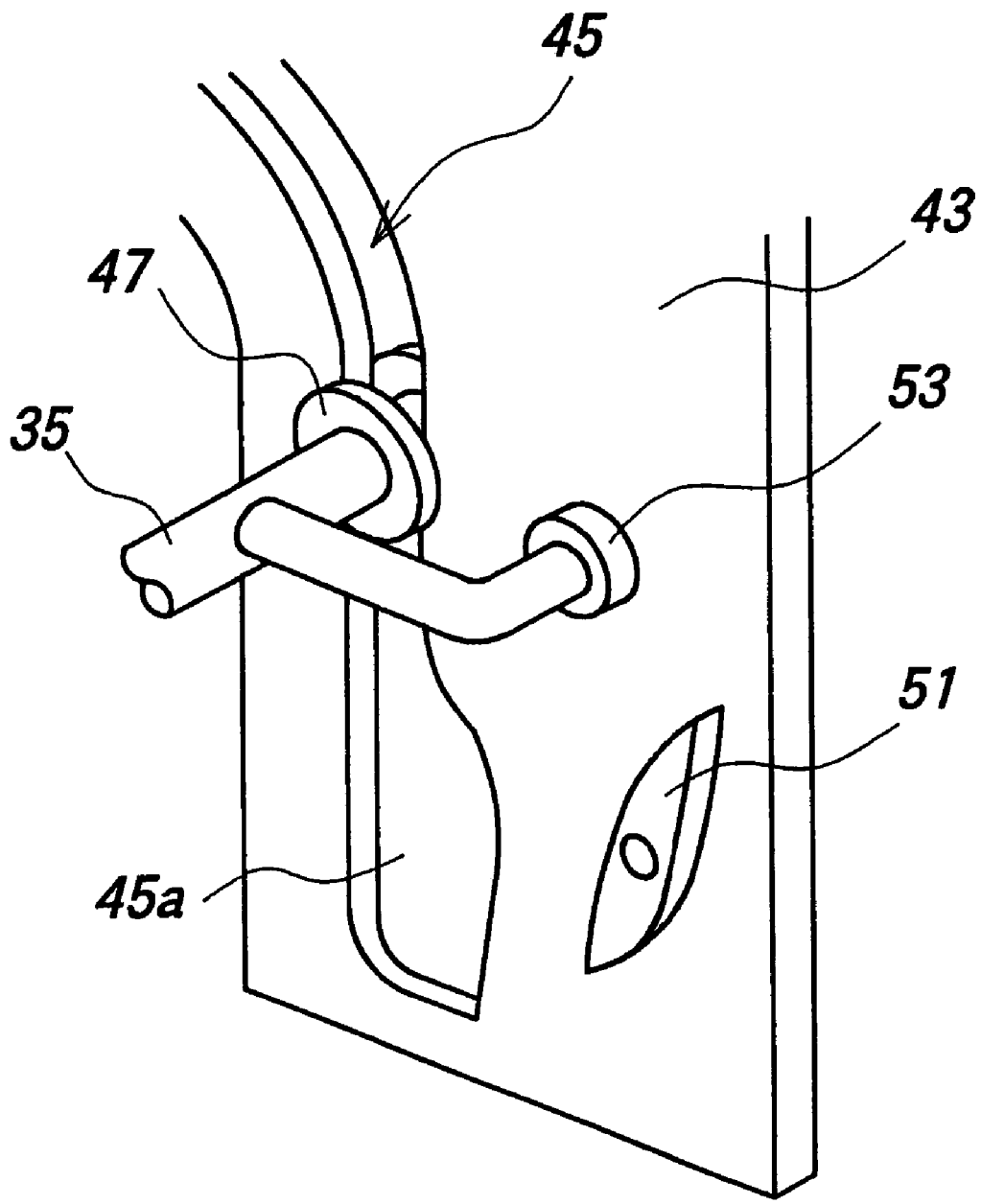
FIG. 8 is a perspective view showing the major part of an advanced example of the cam mechanism.

FIG. 8 shows a cam mechanism which has been designed in view of the structure and operation of a press mechanism to be more fully described hereinafter, in order that the feed mechanism 31 performs its operation smoothly and positively, without the risk of its interference with the press mechanism.

Figure 5:
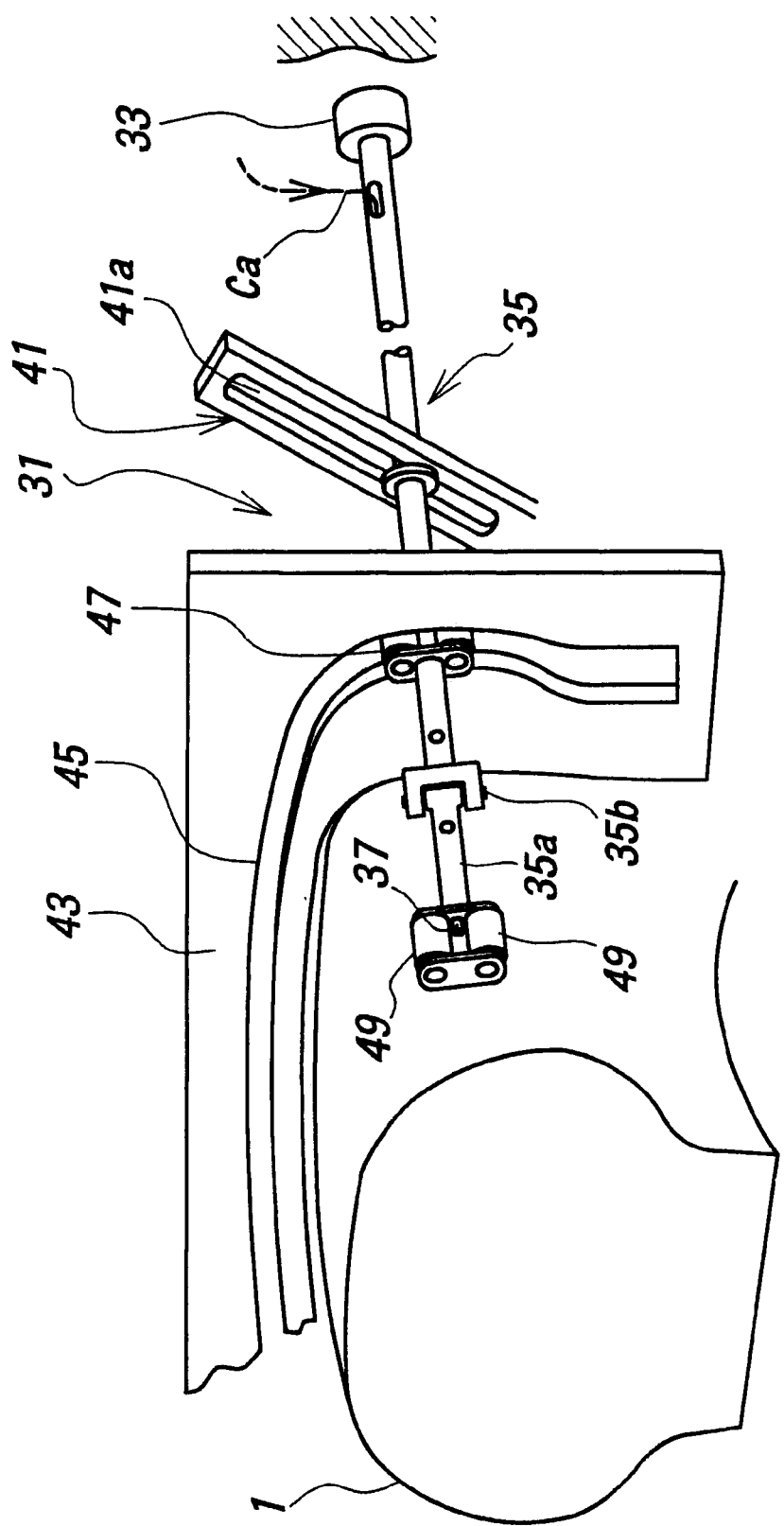
FIG. 5 is a schematic perspective view showing major part of the apparatus according to another embodiment of the present invention.
Figure 6:
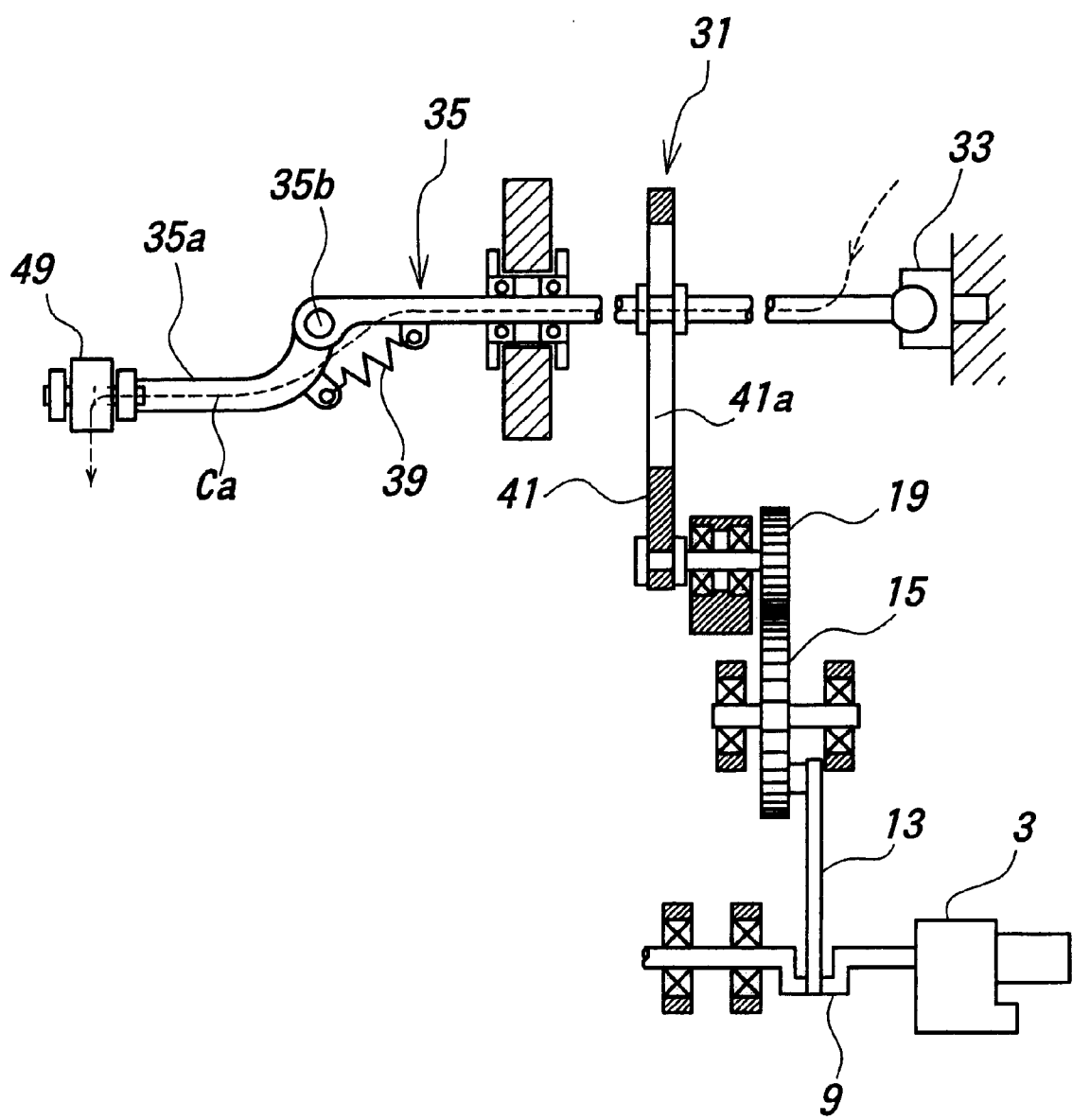
FIG. 6 is a partially sectional view showing the drive system in the apparatus shown in FIG. 5.

The cam mechanism is generally the same as that shown in FIG. 5, but modified so that the cam groove 45 of the stationary cam plate 43 has radially inner end position 45a which are enlarged to have an increased width. The cam plate 43 is further provided with cams 51 which are arranged adjacent to the respective end portions 45a. Each cam 51 is in the form of a vertically elongate eyebrow, and has an intermediate portion where it is rotatably supported on the cam plate 43 on the outer side of the end region 45a, i.e., on that side of the cam groove 45 which is remote from the core 1. The cam 51 is resiliently biased by a spring, now shown, and thereby normally assumes an inclined position in which the cam 51 extends obliquely with its lower end situated close to the cam groove 45. The cam 51 has an outer peripheral surface, which can be engaged by an auxiliary cam follower 53. The auxiliary cam follower 53 is arranged at the distal end of an intermediate branch portion of the arm 35 in the feed mechanism 31.

Figure 9A:
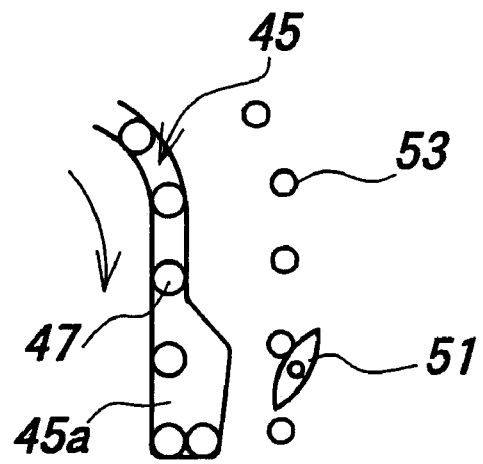
FIG. 9 is an explanatory view showing the operation of the cam mechanism of FIG. 8.

With the above-mentioned arrangement of the cam mechanism, the cam follower 47 is guided by, and moved downwards along the cam groove 45 to reach the enlarged end portion 45a. On this occasion, as particularly shown in FIG. 9a, the auxiliary cam follower 53 in the vicinity of the enlarged end portion 45a is engaged with, and guided by the cam 51 on its side adjacent to the cam groove 45. As a result, the cam follower 47 in the cam groove 45 is moved along the inner periphery of the enlarged end portion 45a, thereby maintaining the operation of the guide rollers 49 in which the carcass cord is adhered onto the outer peripheral surface of the core 1.

Figure 9B:
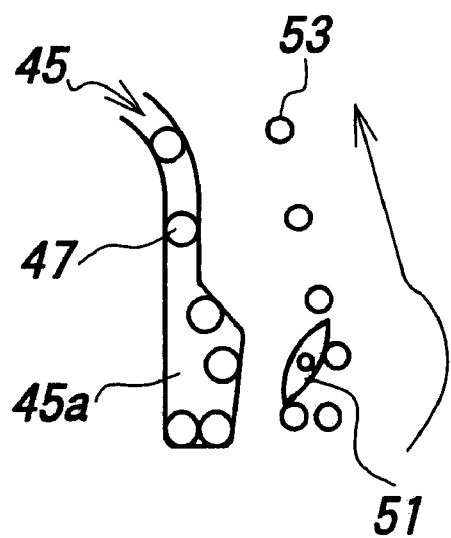

When, on the other hand, the cam follower 47 is moved upwards from the bottom of the enlarged end portion 45a of the cam groove 45, the cam 51 returns to the normal inclined position by the operation of the spring, thereby causing the auxiliary cam follower 53 to be moved along, and guided by the surface of the cam 51 on its side which is remote from the cam groove 45, as shown in FIG. 9b. As a result, the cam follower 47 in the cam groove 45 is moved upwards along the outer periphery of the cam groove 45, thereby lifting the guide rollers 49 from the outer peripheral surface of the core 1 by a distance which corresponds to the width of the enlarged end portion 45a, during which the adhering of the carcass cord is not performed.

In order to ensure that the guide rollers 49 are positively lifted from the outer peripheral surface of the core 1, it may be necessary to limit the operation of the spring means 39 explained with reference to FIG. 6, so as to prevent the front portion 35a of the arm 35 from being folded in excess of a predetermined angle about the hinge 35b.

Figure 10:
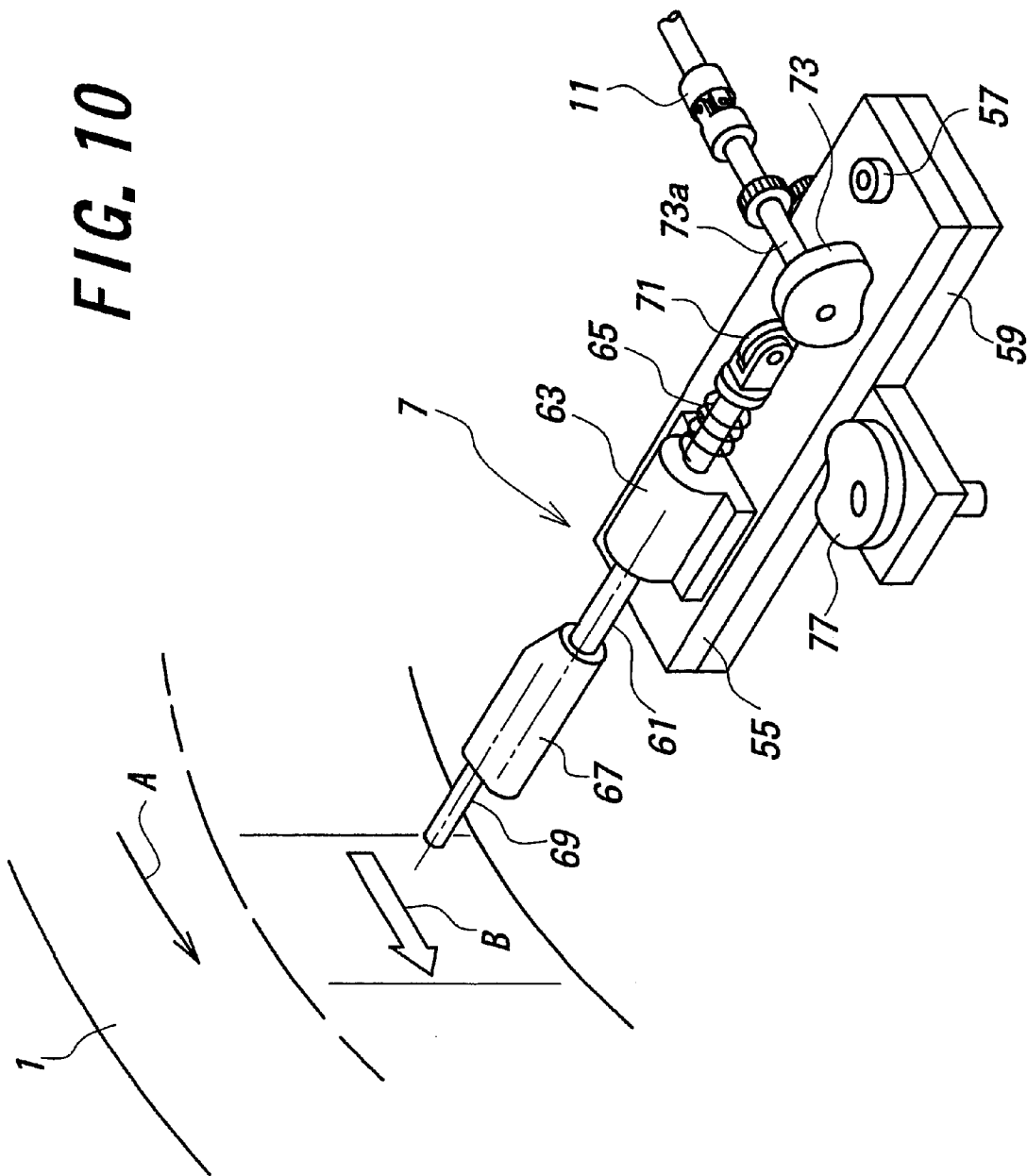
FIG. 10 is a perspective view showing the press mechanism.
Figure 11:
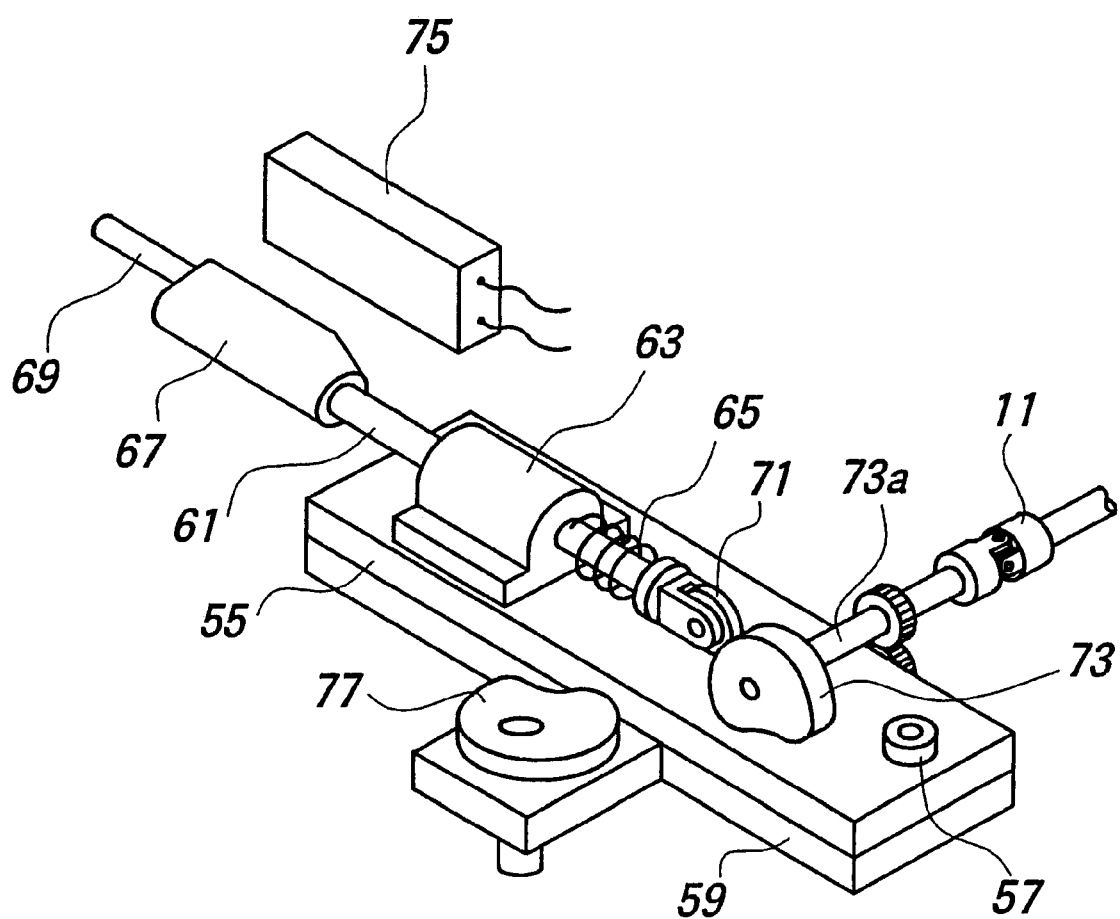
FIG. 11 is a perspective view showing the manner of heating the press head.

The details of the press mechanism 7 is shown in FIG. 10, which is disposed on each side of the core 1. The illustrated press mechanism 7 can be applied to any one of the feed mechanism 5, 31 explained above. In FIG. 10, reference numeral 55 designates a base plate for supporting the major components of the press mechanism 7. The base plate 55 is rotatably supported, at its rear end portion which is situated remote from the core 1, on a stationary member 59 by a pivot 57 which extends in a direction perpendicular to the center axis of the core 1. The arrangement is such that the front end portion of the base plate 55 is capable of swinging in the indexing direction A of the core 1, within a substantially horizontal plane as shown in FIG. 10. On the other hand, the base plate 55 is prevented from swinging in a direction opposite to the indexing direction A, for example by a stopper, not shown.

A rod 61 is supported on the base plate 55 through a bearing 63, and is preferably prevented from rotation about its own axis. The rod 61 is movable in the advancing and the retracting directions, and urged in the retracting direction by, e.g. a coil spring 65. The rod 61 has a distal end which is provided with a generally cylindrical press head 67 in which a pin 69 is urged in the advancing direction by a spring, not shown.

The rod 61 and the pin 69 are preferably arranged so that the axis of the rod 61 is off-centered from the axis of the pin 69 in the indexing direction A of the core 1. The press head 67 has a shoulder portion at its rear end, which is preferably rounded on its side opposite to the indexing direction A of the core 1.

In order to positively advance and retract the press head 67 and the pin 69 whenever necessary, the rear end of the rod 61 is provided with a cam follower 71 which is in contact with the peripheral surface of a cam 73. The cam 73 has a shaft 73a which is connected, for example, to the output shaft of the geared motor 3 through the crank 9 and the universal joints 11, as shown in FIG. 1. The drive shaft 73a of the cam 73 is supported on the stationary member by a bearing, not shown, so as to maintain the cam 73 in position.

The cam 73 serves to urge the rod 61 through the cam follower 71, so as to move the press head 67 and the pin 69 in the advancing direction. On this occasion, as an initial stage, the pin 69 is brought into abutment against a side surface of the core 1. Subsequently, the press head 67 is further advanced with respect to the pin 69, until the distal end surface of the press head 67 is also brought into abutment against the side surface of the core 1.

Such function of the cam 73 should be acheived not only before the swing movement of the base plate 55 as shown in FIG. 10, but also during and after the swing movement. Therefore, the cam 73 is made to have a sufficient thickness to that the cam follower 71 can be always maintained in contact with the surface of the cam 73 even when the cam follower 71 is moved relative to the cam 73 in its thickness direction due to the swing motion of the base plate 55.

The press head 67 of the press mechanism 7 is brought into abutment with the side surface of the core 1 as explained above, primarily for the purpose of ensuring that the substantially U-shaped turn-up portion of the carcass cord Ca fed by the swinging feed mechanism 5 is positively adhered onto the outer peripheral surface of the core 1. However, depending on the kind of rubber such as inner liner rubber coated on the outer peripheral surface of the core 1, and coating rubber of the carcass cord Ca, etc., there may be instances in which the rubber-coated carcass cord cannot be adhered onto the inner liner rubber with a sufficient strength, solely by the pressure from the press head 67. In view of such possibility, it is preferred that the press head 67 is subjected to a preliminary heating by an external, stationary heating means, e.g., a far-infrared radiation heater, so as to previously improve the adhering force of the rubber-coated carcass cord to the inner liner rubber. The external heating device also serves to avoid an excessive heating of the pin 69 around which the turn-up portion of the carcass cord Ca is temporarily wound, and to prevent damages to the wiring.

Figure 12:
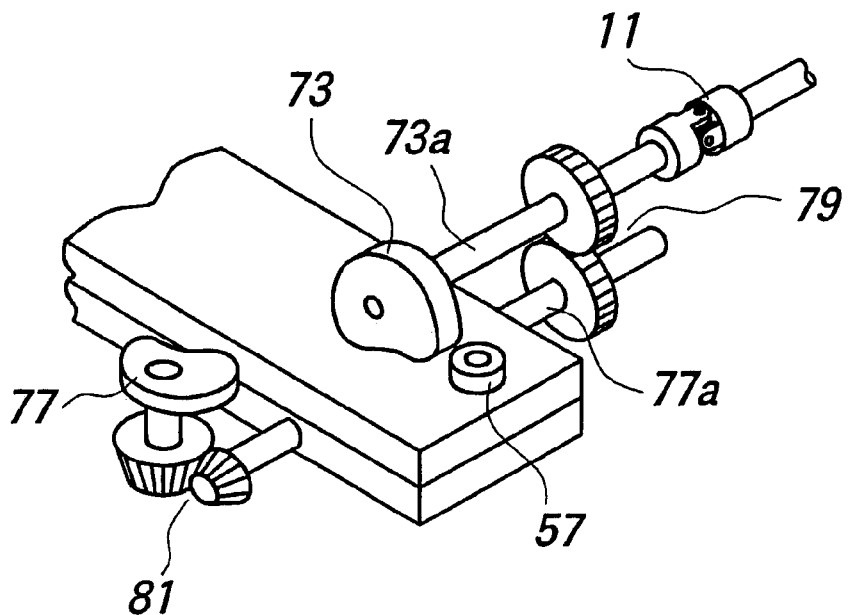
FIG. 12 is a schematic perspective view showing an example of cam mechanism for returning the base plate.

When the core 1 is subjected to an indexing movement, with the pin 69 alone, or the pin 69 and the press head 67 in abutment against the side portion of the core, the base plate 55 is caused to swing about the pivot 57 in the indexing direction A, together with the pin 69 and the press head 67. After completion of such swinging movement or, more accurately, after finishing the operation of the press head 67 and the pin 69 following the swinging movement of the base plate 55, the base plate 55 is returned to the initial position as shown in FIG. 10. To this end, the press head 67 and the pin 69 are moved away from the outer peripheral surface of the core 1, and the base plate 55 is returned by a return spring exerting a relatively small force which does not hinder the swinging movement of the base plate 55, to a limit position where the base plate 55 is brought into abutment against a stopper. Alternatively, as shown in FIG. 12, the base plate 55 may be positively pushed back a cam 77 which operates synchronously with the operation of the cam 73 and, hence, with the operation of the press head 67 and the pin 69 as shown in FIG. 12. In the latter case, the shaft 73a of the cam 73 for operating the rod 61 may be connected to a shaft 77a through a pair of gears 79, with the shaft 77a connected to the cam 77 through a pair of bevel gears 81.

In operation, the press mechanism 7 having a structure as described above functions as follows.

As explained above, the carcass cord Ca fed from the cord passage 21 or 37 is arranged so as to extend linearly from one end to the other end of the core 1 with respect to the meridian direction, and vice versa, under the operation of the feed mechanism as shown in FIG. 1 or 5. On such occasion, the substantially U-shaped turn-up portions of the carcass cord Ca formed at the respective ends of the core 1 are adhered onto the outer peripheral surface of the core 1 based on the circumferential indexing operation of the core 1. In order to correctly carry out the adhering of the turn-up portions in a positive and reliable manner, after the carcass cord Ca fed from the cord passage 21 has reached one end of the core 1 with respect to the meridian direction, as shown in FIGS. 13a and 13b, the cam 73 is operated so that the press head 67 and the pin 69 assuming their retracted position as shown in FIG. 14a are advanced to the position shown in FIG. 14b in which the pin 69 is brought into abutment against the outer peripheral surface of the core 1.

Figure 13A:
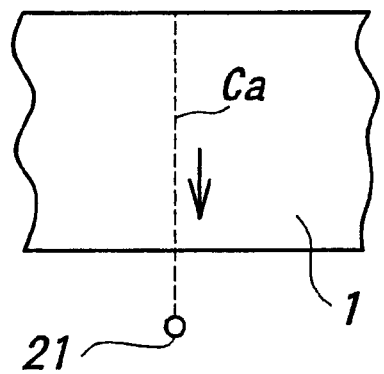
FIGS. 13a and 13b are schematic plan view and schematic side view showing the manner of arranging the carcass cord on one end of the core with respect to its meridian direction.
Figure 13B:
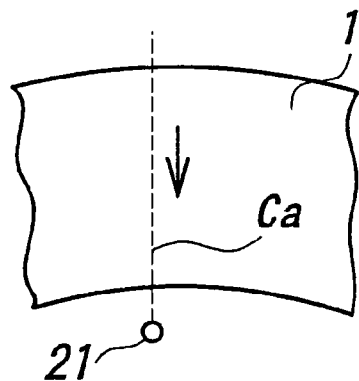
Figure 15A:
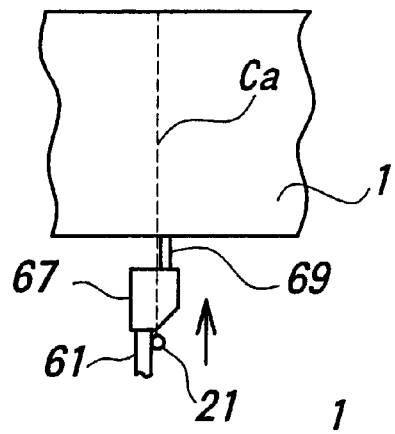
FIGS. 15a and 15b are views, similar to FIGS. 13a and 13b, showing the operation of the pin in the press mechanism.
Figure 15B:
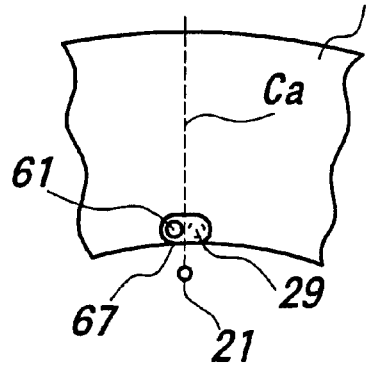

The advanced state of the press head 67 and the pin 69 is shown in FIGS. 15a and 15b which are similar to FIGS. 13a and 13b, and from which it can be appreciated that the carcass cord Ca is arranged so as to extend between the rod 61 and the pin 69 which are offset relative to each other.

Figure 16A:
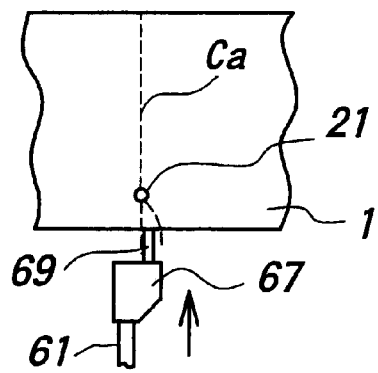
FIGS. 16a and 16b are views, similar to FIGS. 13a and 13b, showing the manner in which the turn-up portion of the cord is looped around the pin.
Figure 16B:
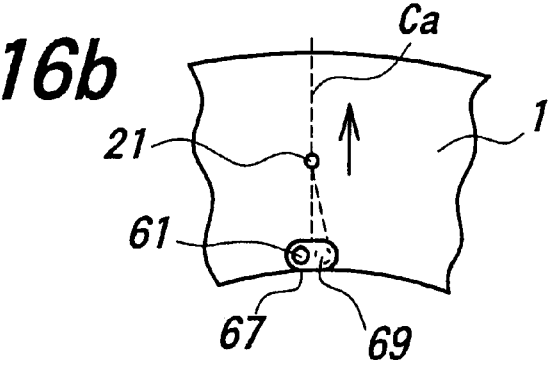

Subsequently, the cord passage 21 is subjected to a return movement through the back side of the advanced press head 67, along substantially the same path as the forward path, and the carcass cord Ca fed along with the return movement of the cord passage 21 is caused to slide on the rounded shoulder of the press head 67. As a result, a substantially U-shaped turn-up portion is formed on the carcass cord Ca as shown in FIG. 16, which is wound about, and supported by the pin 69.

When the carcass cord Ca is wound about the pin 69, the carcass cord Ca is arranged on the outer peripheral surface of the core 1 by the feed mechanism 31 shown in FIG. 5 while being subjected to the adhering by the guide rollers 49. In this instance, during the forward movement of the guide rollers 49, for example, the arrangement of the carcass cord Ca is carried out by allowing the guide rollers 49 to abut with, or come sufficiently close to the outer peripheral surface of the core 1 as shown in FIG. 17a, until one end of the core with respect to the meridian direction is reached under the operation of the cam groove 45 described above with reference to FIG. 9a. Also, during the return movement of the guide rollers 49 after the pin 69 has been brought into abutment with the outer peripheral surface of the core 1, as shown in FIG. 17b, the arrangement of the carcass cord Ca is carried out by moving the guide rollers 49 through the back side of the press head 67, as shown in FIG. 17c, based on the operation of the cam groove 45 descried with reference to FIG. 9b, thereby causing the turn-up portion of the carcass cord Ca to be wound about the pin 69 as shown in FIG. 16, under the operation of the rounded shoulder of the press head 67.

Therefore, irrespective of whether use is made of the feed mechanisms shown in FIG. 1 or the one shown in FIG. 5, the turn-up portion of the carcass cord Ca is wound on the pin 69 in essentially the same manner.

Figure 18A:
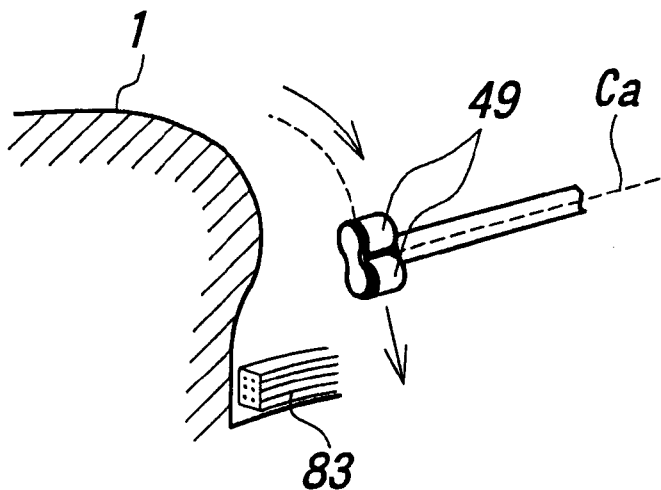
FIGS. 18a to 18c are schematic views showing the process of FIGS. 17a to 17d.
Figure 18B:
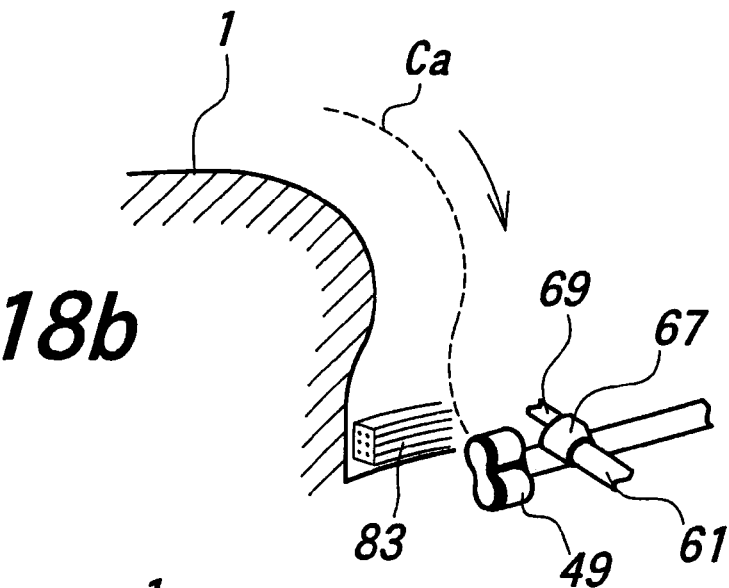
Figure 18C:
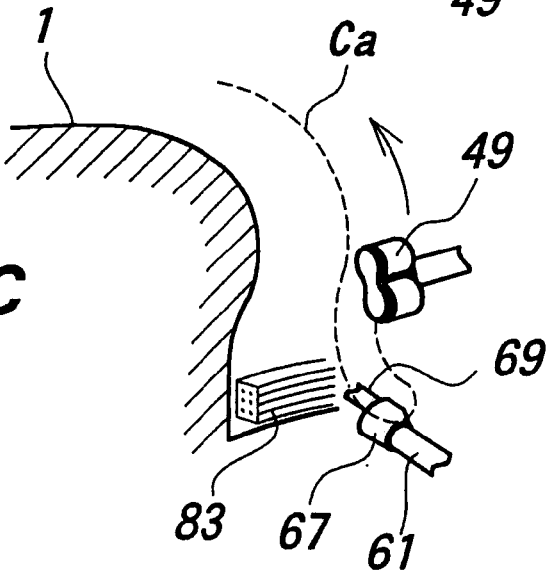

The above-mentioned successive steps are schematically shown in FIGS. 18a, 18b and 18c. The carcass cord Ca fed from the cord passage 37 is suitable adhered on the outer peripheral surface of the core 1 by any one of the guide rollers 49 forming a pair, which are opposed to each other with the carcass cord Ca interposed therebetween. In FIGS. 18a, 18b and 18c, reference numeral 83 designates a bead cord preliminarily arranged on each side portion of the core 1.

In the feed mechanism 31 shown in FIG. 5, a subsequent return movement of the guide rollers 49 is performed while they are maintained in contact with the outer peripheral surface of the core 1, as shown in FIG. 17d, under the operation of the cam groove 45. This ensures that the fed carcass cord Ca is sufficiently adhered to the outer peripheral surface of the core 1.

As described above, after the carcass cord Ca has been wound about the pin 69, the cam 73 causes a further advancing movement of the press head 67, which may or may not be preliminary heated, against the spring force of a compression spring 68a for the pin 69, so that the distal end surface of the press head 67, in addition to the pin 69, is brought into abutment against the outer peripheral surface of the core 1.

Figure 19A:
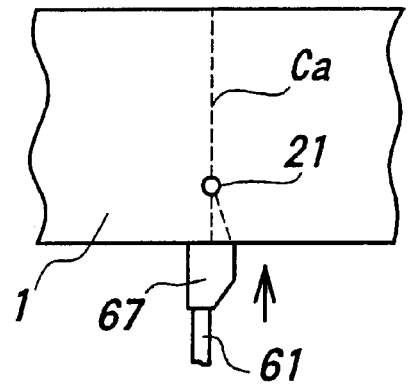
FIGS. 19a and 19b are views, similar to FIGS. 13a and 13b, showing the operation of the press head in the press mechanism.
Figure 19B:
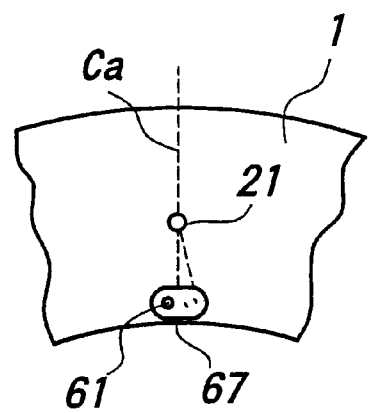

With reference to FIGS. 19a and 19b, it can be seen that the press head 67 is brought into abutment against the outer peripheral surface of the core 1 as described above, together with the turn-up portion of the carcass cord Ca which is wound about the pin 69, and the abutment is achieved with a sufficiently large force, thereby subjecting the turn-up portion of the carcass cord to the desired adhering onto the outer peripheral surface of the core.

In order to ensure such a adhering of the turn-up portion of the carcass cord by the press head 67, and to sufficiently eliminate possible disorder of the cord, etc., due to the subsequent retracting motions of the cord passage 21, it is preferred that the pressure applied from the press head 67 to the cord as described above is maintained until the indexing operation of the core 1 has been completed for the purpose of securing the returning path of the cord passage 21. Accordingly, in the illustrated embodiment, the core 1 is subjected to a predetermined amount of indexing operation with the press head 67 and the pin 69 in abutment against the core 1, as shown in FIG. 14a. In this instance, the press head 67 and the pin 69 are in contact with the outer peripheral surface of the core with a large friction force. Thus, the core 1 during the indexing movement causes the base plate 55, together with the press head 67 and the pin 69 supported thereon, to swing about the pivot 57 in the indexing direction A by an amount which corresponds to the indexing amount of the core 1, as shown by arrow B in FIG. 10.

Figure 20A:
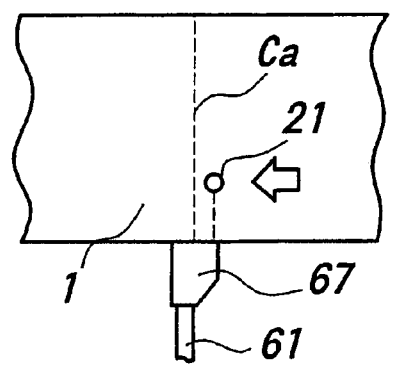
FIGS. 20a and 20b are views, similar to FIGS. 13a and 13b, showing the manner in which the retracting path of the cord passage is preserved.
Figure 20B:
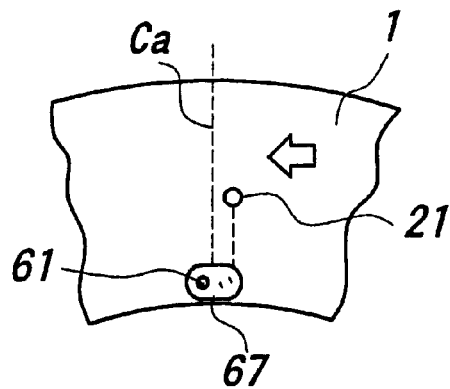

There is shown, in FIGS. 20a and 20b, the state in which the indexing movement of the core 1 has been completed. The indexing movement of the core 1 secures the retracting path, which is spaced by a predetermined distance from the forward path, of the cord passage 21 which always performs the reciprocating movement at a predetermined position.

Figure 21A:
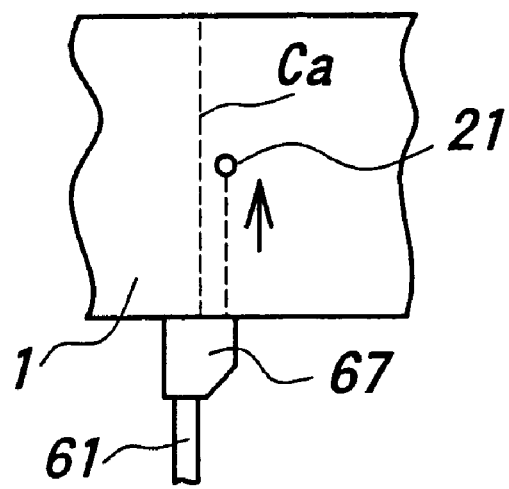
FIGS. 21a and 21b are views, similar to FIGS. 13a and 13b, showing the retracting path of the cord passage.
Figure 21B:
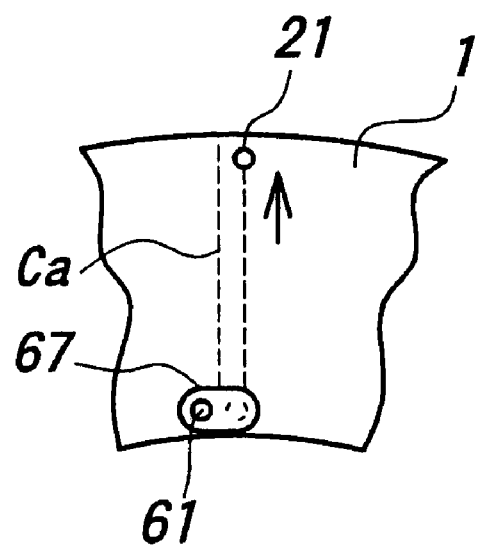

Subsequently, the cord passage 21 undergoes the retracting movement as shown in FIGS. 21a and 21b, and the same process steps as those explained above are separated at the position where the retracting movement has been completed.

On the other hand, after the desired adhering operation with respect to one turn-up portion of the carcass cord has been completed by the press mechanism 7, the cam 73 is operated so that the press head 67 and the pin 69 are returned to their initial positions shown in FIG. 14a, the cam 77 is operated so that the base plate 55 is caused to swing back to the initial position. The press mechanism 7 now assumes a standby position and is ready to perform a next adhering operation.

The above description is for a case in which the core 1 is indexed after the press head 67 and the pin 69 have been brought into abutment against the outer peripheral surface of the core, as shown in FIGS. 19a and 19b. However, the indexing operation may be carried out in a condition wherein it is only the pin 69 that is in abutment against the outer peripheral surface of the core 1, as shown in FIGS. 15a and 15b. In the latter case, the retracting path of the cord passage 21 is ensured in its earlier stages as compared to the former case, so that the cord passage 21 performs the retracting movement with an earlier timing, thereby reducing its cycle time. Moreover, the latter case does not require offsetting between the axis of the rod 61 of the press mechanism 7 relative to the axis of the pin 69, and it is possible to form the shoulder portion at the rear end of the press head 67 as a rounded shoulder, which still allows the turn-up portion of the carcass cord Ca to be wound about the pin 69.

Figure 22:
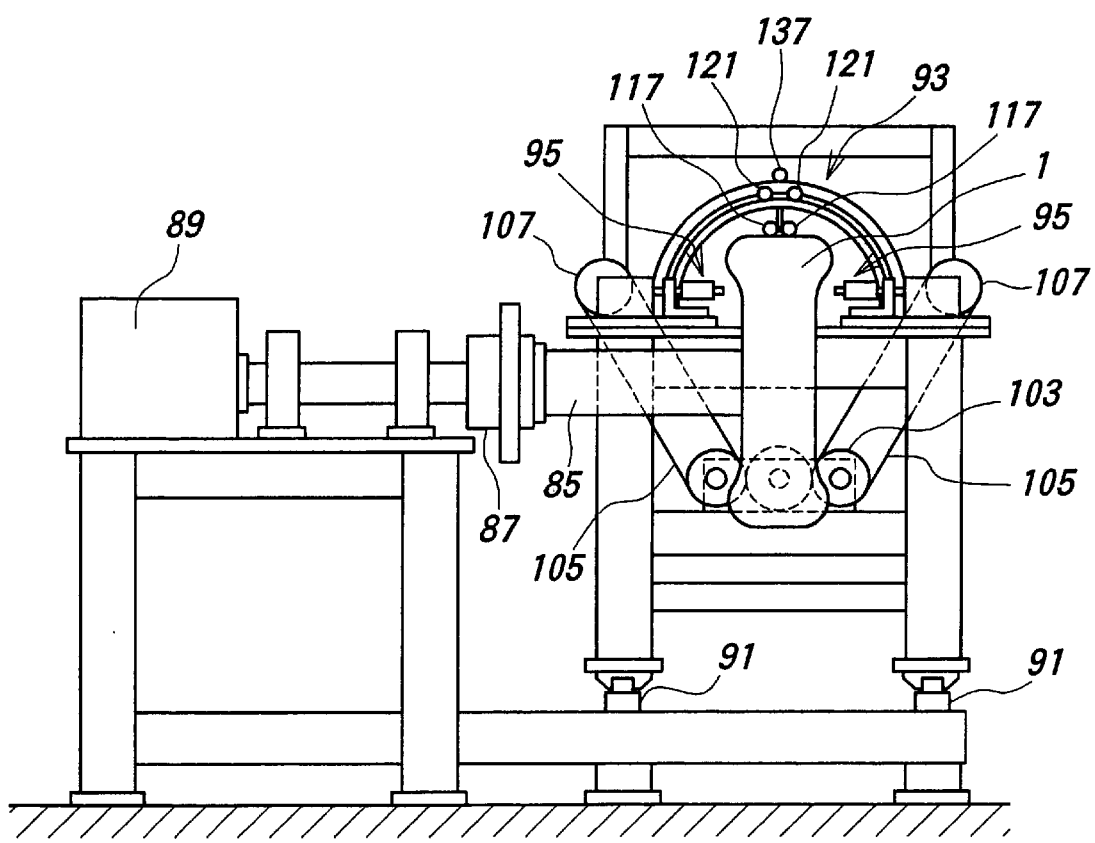
FIG. 22 is a front view showing the entire apparatus.

The entire arrangement of the apparatus according to the present invention is shown in FIGS. 22–24, which incorporate the basic constructions of the above-mentioned mechanisms. The core 1 can be subjected to indexing movement by a predetermined angle at one time by connecting, for example, a supporting shaft 85 of the core 1 to a servomotor 89 through a detachable coupling 87, as shown in FIG. 22. Also, in order to carry out preceding or succeeding process steps, the core 1 is arranged so that it is movable horizontally, together with the swinging feed mechanism 93 and the press mechanism 95, etc., in a direction perpendicular to the sheet by the operation of a linear guide device 91 with the coupling 87 detached.

The drive system for the feed mechanism 93 can be constructed by connecting the output shaft of the geared gear 3, which is arranged on a base frame 97, to the large gear 15 through the crank 9 and the connecting rod 19, and by connecting the small gear 19 in mesh with the large gear 15 to the arm 17. With such a drive system, the arm 17 can be operated as is the case with that shown in FIG. 1.

On the other hand, the drive system for the press mechanism 95 differs slightly from the above-mentioned system in that the drive path is free from universal joints 11. Thus, the geared motor 3 is connected to the cam 73 through a drive path which is comprised of a gear 99 secured to the output shaft of the geared motor 3, a gear 101 meshed with the gear 99, a pulley 103 connected to the gear 101, a pulley 107 connected to the driving shaft 73a of the cam 73, and an endless belt 105 passed over the pulleys 103 and 107. The pulleys 103, 107 and the endless belt 105 may be replaced with sprockets and chain, respectively.

As shown in FIGS. 24a and 24b, the feed mechanism 93 includes a cord feeding portion which is constructed as follows. The arm 17 of the feed mechanism 93 is rotatably supported on a stand 109 and has a distal end which is provided with a cord passage 113 through a block 111. A pair of guide rollers 117 are arranged on both sides of the distal end 115 of the cord passage 113. The cord passage 113 is urged downwards by a spring means 119 which is arranged in the block 111. The block 111 has front and rear portions which are provided with cam followers 121, 123, respectively. These cam followers 121, 123 are engaged with cam grooves 129, 131 which are formed in stationary cam plates 125, 127, respectively. The block 111 also has an intermediate portion which is provided with a bracket 133 for supporting a cord guide member 135. The cord guide member 135 is provided with a roller 137 which is engaged with the outer peripheral surface of the cam plate 125. The spring means 119 serves to normally urge the guide rollers 117 into abutment against the outer peripheral surface of the core 1. The cam followers 121, 123 and the roller 137 allow the block 111 and, hence, the cord passage 115 to be accurately moved in a desired manner.

It can be appreciated from the foregoing description that the present invention provides an improved apparatus which is simple and compact in structure and operable an a high speed. The apparatus is featured by a swinging feed mechanism and press mechanism which can be smoothly operated ensuring that the carcass cord is fed and applied onto the outer peripheral surface of the core so that the turn-up portion of the carcass cord can be adhered on the outer peripheral surface of the core in a reliable manner without occurrence of disorders.

While the present invention has been described above with reference to specific embodiments they were pressed by way of examples only and various changes and modifications may be made without departing from the scope of the invention as defined by the appended claims.

What is claimed is:

1. An apparatus for producing tires, wherein a carcass layer is formed by continuously feeding a carcass cord from a cord passage and applying the carcass cord over an outer peripheral surface of a substantially toroidal core so as to extend in a meridian direction of the core while the core is subjected to an indexing movement in its circumferential direction, said apparatus comprising:

a feed mechanism for causing a reciprocating movement of said cord passage in said meridian direction of the core, said feed mechanism including a swing arm having a distal end which supports said cord passage; and a press mechanism including a pin about which said carcass cord is supported at a turn-up position of the reciprocating movement of said cord passage, said which can be moved into abutment with said core, and a press head which can be advanced relative to the pin, for pressing a loop portion of said carcass cord to said core, said press mechanism being arranged so that it can be swung in said indexing direction along with the indexing movement of the core, and returned to its initial position after said pin has been separated from said core.

2. The apparatus according to claim 1, wherein said feed mechanism and said press mechanism are connected to a common drive motor.

3. The apparatus according to claim 1, wherein at least one guide roller is arranged adjacent to said cord passage, for guiding said carcass cord fed from said cord passage.

4. The apparatus according to claim 1, wherein said feed mechanism causes the reciprocating movement of the cord passage at a position which is spaced from an outer peripheral surface of the core.

5. The apparatus according to claim 4, further comprising a guide plate for guiding the carcass cord fed from the cord passage to the outer peripheral surface of the core.

6. The apparatus according to claim 1, wherein said feed mechanism causes the reciprocating movement of the cord passage at a position which is close to outer peripheral surface of the core, and feeds the carcass cord from the cord passage while applying the carcass cord onto the outer peripheral surface of the core.

7. The apparatus according to claim 1, wherein said arm of the feed mechanism is engaged with a cam groove so as to define a reciprocating path of the cord passage.

8. The apparatus according to claim 1, wherein said arm of the feed mechanism is a crank-shaped arm which defines a reciprocating path of the cord passage as a distance between a center of rotation of the arm and the cord passage at the distal end of the arm.

9. The apparatus according to claim 1, wherein the feed mechanism is connected to a drive motor through a drive system including a first gear which can be reciprocated within a predetermined angular range, and a second gear meshed with the first gear.

10. The apparatus according to claim 9, wherein said first gear is connected to said drive motor through a crank and a connecting rod.

11. The apparatus according to claim 9, wherein the feed mechanism is provided with a yoke for connecting said arm with said second gear and thereby causing the reciprocating movement of the cord passage.

12. The apparatus according to claim 1, wherein the press mechanism comprises a base plate to which said pin and said press head are attached, a stationary member for rotatably supporting said base plate through a pivot which is directed perpendicularly to a center axis of said core, and a returning means for returning said base plate to its initial position after it has been swung in the indexing direction of the core.

13. The apparatus according to claim 12, wherein the press mechanism comprises a rod which can be advanced and retracted with respect to the core, said rod being disposed on said base plate and normally biased in the retracting direction, and having a distal end on which said press head is provided, and said pin being disposed in said press head so as to be urged in the advancing direction thereof.

14. The apparatus according to claim 13, wherein a drive motor for the press mechanism has an output shaft provided with a cam which is in abutment against a rear end of said rod for advancing said rod.

15. A method for producing tires, wherein a carcass layer is formed by continuously feeding a carcass cord from a cord passage and applying the carcass cord over an outer peripheral surface of substantially toroidal core so as to extend in a meridian direction of the core while the core is subjected to an indexing movement in its circumferential direction, said method comprising the steps of:

arranging said carcass cord so as to extend linearly from one end to the other end of said core with respect to a meridian direction of said core, and vice versa, under the operation of a feed mechanism which is capable of achieving a reciprocating movement;

winding a turn-up portion of said carcass cord on a pin which can be brought into abutment with said end of the core, at said end of the core; and adhering said turn-up portion onto said core by a press head which can be advanced relative to said pin and brought into abutment with said core, wherein said indexing movement of the core is carried out with said press head advanced relative to the pin, while moving said press head in the same direction as said core.

16. A method for producing tires, wherein a carcass layer is formed by continuously feeding a carcass cord from a cord passage and applying the carcass cord over an outer peripheral surface of a substantially toroidal core so as to extend in a meridian direction of the core while the core is subjected to an indexing movement in its circumferential direction, said method comprising the steps of:

arranging said carcass cord so as to extend linearly from one end to the other end of said core with respect to a meridian direction of said core, and vice versa, under the operation of a feed mechanism which is capable of achieving a reciprocating movement;

winding a turn-up portion of said carcass cord on a pin which can be brought into abutment with said end of the core, at said end of the core; and adhering said turn-up portion onto said core by a press head which can be advanced relative to said pin and brought into abutment with said core, wherein said indexing movement of the core is carried out while moving said pin in the same direction as said core before formation of said turn-up portion of the carcass cord, said turn-up portion being formed after completion of said indexing movement of the core.

17. The method according to claim 15, wherein other tire component members are applied onto said carcass layer.

18. The method according to claim 16, wherein other tire component members are applied onto said carcass layer.

* * * * *